June 19, 1956 R. C. KENNEDY 2,751,431
COLOR TELEVISION SIGNALLING APPARATUS
Filed June 16, 1953
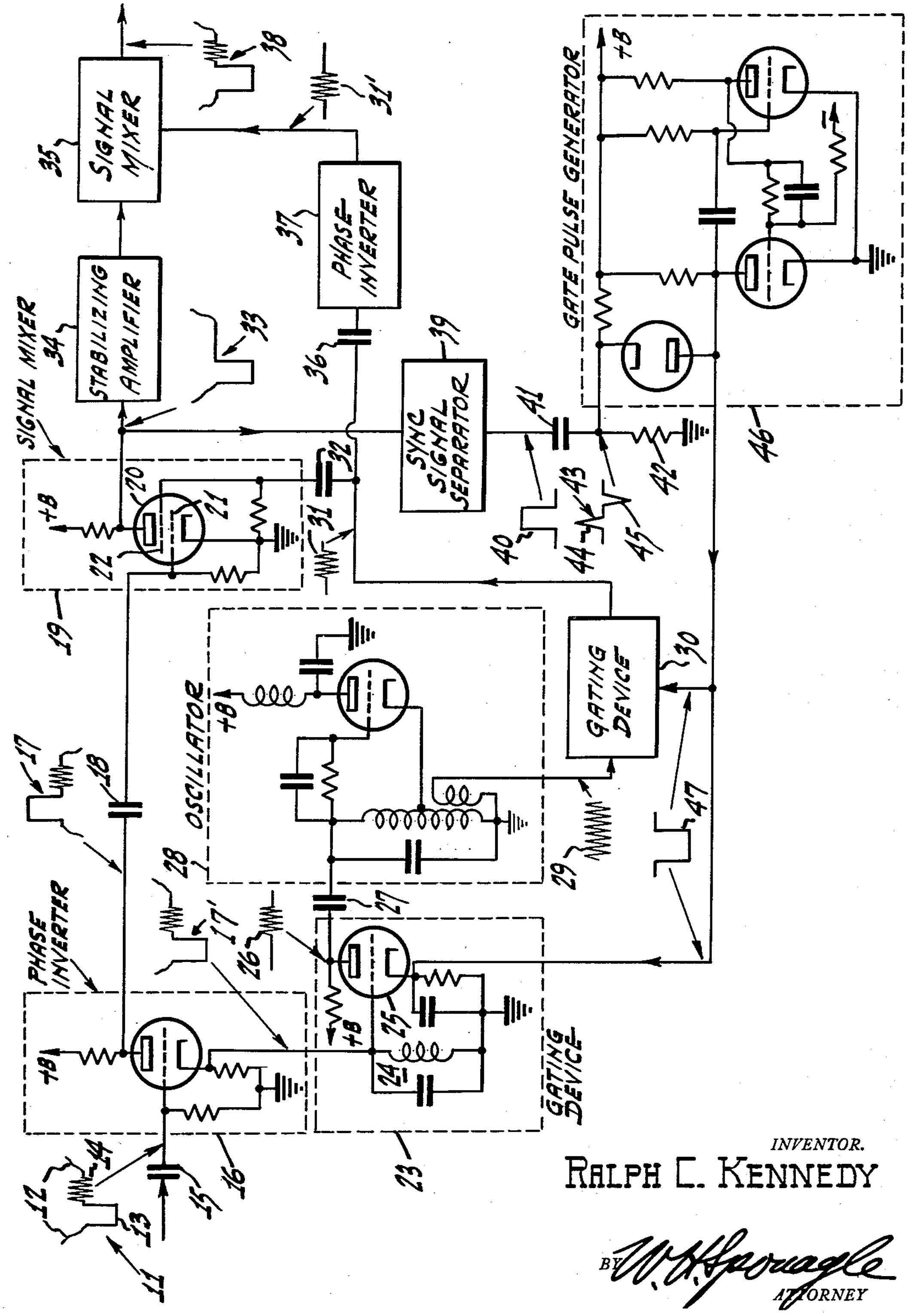
INVENTOR.
RALPH C. KENNEDY
BY W. H. Sprague
ATTORNEY United States Patent Office 2,751,431

Patented June 19, 1956

2,751,431

COLOR TELEVISION SIGNALLING APPARATUS

Ralph C. Kennedy, Queens Village, N. Y., assignor to Radio Corporation of America, a corporation of Delaware Application June 16, 1953, Serial No. 362,032

The terminal 15 years of the term of the patent to be granted has been disclaimed 7 Claims. (Cl. 178—5.4)

This invention relates to color television systems and particularly to the modification, such as the amplification, of composite color television signals.

In the type of color television system in accordance with the standards adopted for U. S. color television broadcast use by the Federal Communications Commission, the composite television signal, which is transmitted and received, includes a luminance video signal which is generally similar to the present black and white video signal; a chrominance signal which is a phase- and amplitude-modulated sub-carrier wave having a frequency corresponding to one of the higher luminance video signal frequencies; deflection synchronizing pulses for the control of the raster scanning apparatus; and periodic unmodulated bursts of the color subcarrier wave following the deflection synchronizing pulses and employed for effecting phase and synchronizing control of the apparatus by which the color subcarrier wave is modulated and demodulated. In such systems, it frequently is desired to pick up the composite television signal at a remote point for relaying to the main transmitting station from which it is broadcast. Such remote pickups may be from a portable transmitter, a camera located remote from the main studio or the remotely derived signal may be obtained from a network such as a coaxial cable, a micro-wave relay system or the like. In any case, the relaying of the remotely derived composite television signal often subjects the signal to various types of interference effects which tend to distort portions or all of the composite signal. In other cases, the signals, when received at the main broadcast transmitter, may have too low an amplitude level to be impressed directly upon the main transmitter.

In such instances, it is usual to employ a so-called "stabilizing" amplifier for modifying the composite television signal received from a remote pick-up point. Representative types of stabilizing amplifiers which are in common use for the modification of black and white composite television signals are the RCA Model TA-5B, which is described at page 34 of "Broadcast News" for May 1948, and the RCA Model TA-5C, disclosed in the "RCA AM-FM Broadcast Equipment Catalogue—1950" at page 189. In general, such stabilizing amplifiers include circuits for suitably amplifying the video signal, for restoring the synchronizing pulses to their proper shapes and amplitudes by means of a "stretching" or equivalent circuit, and for otherwise modifying the waveform of the composite signal for the correction of any distortion therein.

While stabilizing amplifiers of the type referred to are quite satisfactory for the modification of black and white composite television signals, they are not in all cases adequately suited for the modification of a composite color television signal in accordance with the FCC approved standards mentioned above. One of the reasons for such a deficiency is the presence of the burst or subcarrier wave frequency following the synchronizing pulses. Because of the relationship of these two synchronizing signals, the conventional stabilizing amplifier, in reforming the synchronizing pulses, has an adverse distorting effect upon the subcarrier wave bursts. However, in view of the other uses for such standard stabilizing amplifiers and in view of the general usefulness of such apparatus for composite color television signals of the type referred to, it is generally desirable to use such apparatus for both black and white and color television signals.

It, therefore, is an object of the present invention to provide apparatus for modifying a composite color television signal suitable for use with a conventional black and white stabilizing amplifier.

Another object of the invention is to provide a novel arrangement of apparatus for temporarily removing the color synchronizing signal bursts from a composite color television signal so that the signal may be modified by conventional black and white apparatus.

Still another object of the invention is to provide novel apparatus for eliminating the color synchronizing signal bursts from a composite color television signal without otherwise changing the remainder of the composite signal so that it may be modified by conventional black and white stabilizing apparatus.

A further object of the invention is to provide novel apparatus for eliminating the color synchronizing signal bursts from a composite color television signal so that the remainder of the signal may be modified by conventional black and white stabilizing apparatus and for subsequently reinserting the color synchronizing signal bursts into the composite color television signal.

In accordance with the present invention, the apparatus for removing the color synchronizing signal bursts from a composite color television signal for use in a system in accordance with FCC approved standards includes a means for producing a continuous wave having substantially the same frequency as that of the color subcarrier wave bursts. The apparatus also includes a signal mixer having two input circuits and an output circuit. The composite color television signal is impressed upon one of the signal mixer input circuits and the output of the continuous wave producing means is periodically coupled to the other input circuit of the signal mixer so that bursts of the continuous wave may be impressed upon the signal mixer in a 180° out-of-phase relationship to the color synchronizing signal bursts of the composite signal. The continuous wave bursts also have a suitable amplitude whereby to produce in the output circuit of the signal mixer a composite television signal without the subcarrier wave bursts. The signal mixer effectively eliminates the subcarrier wave bursts by cancellation. The composite signal then may be impressed upon a black and white stabilizing amplifier for suitable modification.

The coupling of the local continuous wave producing means to the signal mixer is effected under the control of an intermittently operated device. The intermittent operation of his device is controlled by means of timing pulses derived from the composite television signal. These timing pulses may be produced under the control of the deflection synchronizing pulses, particularly the trailing edges thereof. One such means in accordance with a particular embodiment of the present invention is by differentiating the deflection synchronizing pulses and using the trailing edge differentiation impulse to control the operation of a generator, such as a multivibrator, for the production of the timing pulses.

The apparatus in accordance with the present invention also may include means for reinserting the color synchronizing signal bursts into the composite television signal after it has been suitably modified. Such apparatus includes another signal mixer upon one input circuit of which is impressed the modified composite signal and upon another input circuit of which there is impressed the bursts of the continuous wave in proper phase to conform with the FCC approved standards.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single figure of the drawing is a circuit diagram, partly in block and partly in schematic form, showing an illustrative embodiment of the invention.

Having reference now to the drawing, there is indicated a composite color television signal 11 in accordance with presently FCC approved standards. This signal includes a video signal component 12 which, it will be understood, includes a luminance video signal and a chrominance video signal in the form of a phase and amplitude-modulated color subcarrier wave having one of the higher video frequencies. Presently, this frequency is approximately 3.58 megacycles. The composite color television signal 11 also includes a deflection synchronizing pulse 13 which, for the purpose of the present description, will be assumed to be the horizontal synchronizing pulse. Also, the composite color television signal includes a color synchronizing signal burst 14 of an unmodulated color subcarrier wave located in the so-called back porch region of the horizontal synchronizing waveform. Accordingly, it is seen that the color synchronizing signal bursts follow the deflection synchronizing pulses in time.

Such a composite color television signal 11 may be derived from any of the specified remote pick-up points and coupled by means such as a capacitor 15 upon an isolation amplifier and phase inverter 16. It is to be understood that the particular details of the apparatus shown for illustrative purposes are not necessarily limiting so far as the scope of the present invention is concerned. However, for the purpose of definiteness and completeness, certain of the components of the apparatus embodying the invention are shown in schematic circuit form. Accordingly, it will be understood that the phase inverter 16 may be of any conventional type such as, for example, that shown in U. S. Patent 2,027,054 granted January 7, 1936, to B. F. Miessner and titled "Amplifier System."

There are derived from the two output circuits of the phase inverter 16 opposite phases 17 and 17′ of the composite color television signal. The composite color television signal 17 is coupled by means including a capacitor 18 to a first signal mixer 19. The signal mixer 19 may be of any desired form. As illustrated here, it includes an electron tube 20 having two input circuits including grids 21 and 22. The output circuit is derived from the anode of this tube. As described, the composite color television signal 17 is impressed upon a first input circuit of the signal mixer tube which includes the control grid 21.

The composite color television signal 17′ derived from the phase inverter 16 is impressed upon a first gating device 23 which is of a character to be responsive particularly to the color synchronizing signal bursts. One means by which the gating device 23 may be made responsive to the color synchronizing signal bursts is the use of an LC circuit 24 tuned to the frequency of the color synchronizing signal bursts. The tuned circuit 24 is part of the input circuit of the gating device which includes an electron tube 25. This tube is biased in such a manner that the gating device 23 normally is closed so that the input circuit energy at the color synchronizing burst frequency which is developed in the tuned circuit 24 is not transferred to the output circuit which includes the anode of the tube 25. Periodically, however, the cathode circuit of the tube 25 is subjected to gate controlling pulses which effectively open the gate during burst intervals so as to transfer to the output circuit thereof the color synchronizing signal bursts 26 which are separated from the composite color television signal.

The separated color synchronizing signal bursts 26 are impressed by means including a capacitor 27 upon the frequency determining circuit of a continuous wave generator such as an oscillator 28. As illustratively shown herein, the oscillator 28 may be of the Hartley type such as that disclosed in the "Radio Engineers Handbook" by F. E. Terman published by McGraw-Hill Book Co., Inc., New York, New York, at page 481 in Figure 2. The oscillator 28 is effective in producing in its output circuit a continuous wave 29 having the frequency of the color synchronizing signal bursts. By means of the described impression of the separated color synchronizing signal bursts 26 upon the frequency determining circuit of the oscillator 28, this oscillator, which generally is of the free-running type, is locked in synchronism and in a predetermined phase relationship to the color synchronizing signal bursts.

The continuous wave 29 at the subcarrier wave frequency is impressed upon a second gating device 30 which, if desired, may be of the same character as the first gating device 23. It also is periodically rendered conducting or opened for the transfer of periodic bursts 31 of the continuous wave 29 to its output circuit. The production of the continuous wave bursts 31 is made to coincide, by means to be described presently, with the color synchronizing signal bursts of the composite color television signal.

The continuous wave bursts 31 are impressed by means including a capacitor 32 upon the second input circuit including the grid 22 of the signal mixer 19. By suitably arranging the circuits between the phase inverter 16 and the signal mixer 19, by means of which the respective composite signals 17 and 17′ are conveyed, the continuous wave bursts 31 are impressed upon the signal mixer in a 180° out-of-phase relationship to the color synchronizing signal bursts of the composite signal 17. Also, by suitably adjusting the respective amplitudes of the composite color television signal 17 and the continuous wave bursts 31, the color synchronizing signal burst component of the composite signal may be effectively cancelled by the continuous wave bursts 31 in the signal mixer tube 20 so that there is produced in the output circuit of the signal mixer a composite television signal 33 which has the same general form as a black and white composite television signal. It is seen that the color synchronizing signal burst is entirely eliminated from the back porch region of the horizontal synchronizing waveform.

The composite television signal 33 from which the color synchronizing signal bursts have been removed is impressed upon the input circuit of a stabilizing amplifier 34. This stabilizing amplifier may be of a conventional character for general use with black and white television signals such as either of the RCA Models TA–5B or TA–5C previously referred to.

The modified composite television signal derived from the output of the stabilizing amplifier 34 is impressed upon one input circuit of a second signal mixer 35. This signal mixer may be similar in character to the first signal mixer 19 previously described. Also, the continuous wave bursts 31 are coupled by means including a capacitor 36, and a second phase inverter 37 if necessary, upon a second input circuit of the signal mixer 35. The phase inverter 37 may or may not be required, depending upon the number of stages and character thereof included in the stabilizing amplifier 34. The circumstances under which the phase inverter may be required are well known to those skilled in the art and further discussion thereof is not necessary. It will be understood, however, that there is impressed upon the second input circuit of the signal mixer 35 a continuous wave burst 31′ of suitable phase and amplitude for combination with the composite television signal 33 to form a composite color television signal 38 which is in accordance with the FCC approved standards. Such a composite color television signal is derived from the output circuit of the signal mixer 35.

The timing of the operation of the gating devices 23 and 30 so that they coincide substantially with the color synchronizing signal burst intervals of the composite color television signal in accordance with the present invention is effected under the control of the horizontal deflection synchronizing pulses. Accordingly, a sync signal separator 39 is coupled to the output of the signal mixer 19. The sync signal separator may be of a conventional character such as that shown in U. S. Patent 2,207,775 granted July 16, 1940, to A. V. Bedford. The separated horizontal sync pulses 40 derived from the sync signal separator 39 are differentiated by means including a capacitor 41 and a resistor 42 to form a differentiated pulse 43 having leading and trailing edge differentiation impulses 44 and 45, respectively.

The differentiated pulses 43 are impressed upon a gate pulse generator 46. In the illustrative embodiment of the invention disclosed herein, the gate pulse generator 46 is a monostable multi-vibrator which may be of the type disclosed in the book titled "Waveforms" published by McGraw-Hill Book Co., Inc., New York, New York, at page 168 in Figures 5–10. The operation of such a device is controlled by the trailing edge differentiation impulse 45 of the differentiated pulse 43 so as to produce a series of timing or gate controlling pulses 47. By suitably adjusting the timing elements of the gate pulse generator 46 in a manner well known to those skilled in the art, the gate controlling pulses 47 may be made to coincide substantially with the intervals during which the color synchronizing signal bursts are being produced.

As indicated, the gate control pulses 47 generated in the manner described are impressed upon the control circuits of the gating devices 23 and 30. By such means, the previously described periodic operation of these gating devices is controlled so as to effectively eliminate the color synchronizing signal bursts from the composite television signal so that the remainder of the signal may be suitably modified by means such as a stabilizing amplifier 34, after which the color synchronizing signal bursts may be reinserted substantially in the manner described.

It thus is seen that there is provided by the present invention novel apparatus by means of which a composite color television signal in accordance with the presently proposed NTSC standards may be suitably altered such as by removing the color synchronizing signal bursts so as to enable use of signal modifying apparatus, such as a stabilizing amplifier, of general utility in black and white signal systems. Also, the apparatus provides for the subsequent insertion of the color synchronizing signal bursts. It will be appreciated that the general system of the invention may be practiced with apparatus differing substantially from that shown for illustrative purposes without departing from the essence of the invention. For example, the continuous wave generator need not necessarily be a free-running oscillator such as that shown. It may be feasible to employ ringing circuits which may be shock excited by the color synchronizing signal bursts and thereby obviate the use of an oscillator. Also, if oscillators are used, other types are considered to be within the scope of the invention. Similarly, the gate pulse generator may take forms other than the particular monostable multivibrator shown for illustrative purposes. A free-running multivibrator may be used satisfactorily without departing from the scope of the invention.

The nature of the invention having been disclosed in an illustrative embodiment, its scope is pointed out in the appended claims.

What is claimed is:

1. In a color television system employing a composite signal including a luminance video signal, a chrominance video signal-modulated color subcarrier wave, deflection synchronizing pulses, and periodic color synchronizing signal bursts of unmodulated color subcarrier wave following said deflection synchronizing pulses, apparatus for removing said subcarrier wave bursts from said composite signal to enable modification of the remainder of said composite signal, said apparatus comprising, means producing a continuous wave at substantially said subcarrier wave frequency, means coupled to said continuous wave-producing means to develop bursts of said continuous wave coinciding with the sub-carrier wave bursts of said composite television signal, and means coupled to said composite television signal source and to said continuous wave burst-developing means for combining said continuous wave bursts with said composite television signal in phase opposition to said subcarrier wave bursts to eliminate said subcarrier wave bursts from said composite television signal so that the remainder of said composite television signal may be modified.

2. In a color television system employing a composite signal including a luminance video signal, a chrominance video signal-modulated color subcarrier wave, deflection synchronizing pulses, and periodic color synchronizing signal bursts of unmodulated color subcarrier wave following said deflection synchronizing pulses, apparatus for removing said subcarrier wave bursts from said composite signal to enable modification of the remainder of said composite signal and for subsequently reinserting said subcarrier wave bursts, said apparatus comprising, means producing a continuous wave at substantially said subcarrier wave frequency, means coupled to said continuous wave-producing means to develop bursts of said continuous wave coinciding with the sub-carrier wave bursts of said composite television signal, means coupled to said composite television signal source and to said continuous wave burst-developing means for combining said continuous wave bursts with said composite television signal in phase opposition to said subcarrier wave bursts to eliminate said subcarrier wave bursts from said composite television signal so that the remainder of said composite television signal may be modified, and means having said modified composite television signal impressed thereon and coupled to said continuous wave burst-developing means for combining said continuous wave bursts with said modified composite television signal.

3. In a color television system employing a composite signal including a luminance video signal, a chrominance video signal-modulated color subcarrier wave, deflection synchronizing pulses, and periodic color synchronizing signal bursts of unmodulated color subcarrier wave following said deflection synchronizing pulses, apparatus for removing said subcarrier wave bursts from said composite signal to enable modification of the remainder of said composite signal, said apparatus comprising, means producing a continuous wave at substantially said subcarrier wave frequency, means coupled to a source of said composite television signal to produce timing pulses coinciding with the subcarrier wave bursts of said composite television signal, a signal mixer having two input circuits and an output circuit, means impressing said composite signal upon one of the input circuits of said signal mixer, means coupled between said composite television signal source and said continuous wave-producing means and responsive to said subcarrier wave bursts to lock said continuous wave-producing means in a predetermined phase relationship with said subcarrier wave bursts, and means coupled between said continuous wave-producing means and the other input circuit of said signal mixer and responsive to said timing pulses to impress 180° out-of-phase bursts of said continuous wave upon said signal mixer to produce in said signal mixer output circuit a composite television signal with said subcarrier bursts removed so that the remainder of said composite television signal may be modified.

4. In a color television system employing a composite signal including a luminance video signal, a chrominance video signal-modulated color subcarrier wave, deflection synchronizing pulses, and periodic color synchronizing signal bursts of unmodulated color subcarrier wave following said deflection synchronizing pulses, apparatus for removing said subcarrier wave bursts from said composite signal to enable modification of the remainder of said composite signal, said apparatus comprising, an oscillator having input and output circuits and producing in its output circuit a continuous wave at substantially said subcarrier wave frequency, means responsive to said synchronizing pulses to produce gate-controlling pulses coinciding with the subcarrier wave bursts of said composite television signal, a signal mixer having two input circuits and an output circuit, means impressing said composite signal upon one of the input circuits of said signal mixer, a normally closed gating device responsive to said subcarrier wave frequency, means coupled between said composite television signal source and said oscillator input circuit and operative to impress said subcarrier wave bursts upon said oscillator to lock the continuous wave oscillator output in a predetermined phase relationship with said subcarrier wave bursts, said gating device being coupled between said oscillator output circuit and the other input circuit of said signal mixer and operative when opened to impress 180° out-of-phase bursts of said oscillator-produced wave upon said signal mixer to produce in said signal mixer output circuit a composite television signal with said subcarrier wave bursts removed so that the remainder of said composite television signal may be modified, and means impressing said gate-controlling pulses upon said gating device to operatively open it.

5. In a color television system employing a composite signal including a luminance video signal, a chrominance video signal-modulated color subcarrier wave, deflection synchronizing pulses, and periodic color synchronizing signal bursts of unmodulated color subcarrier wave following said deflection synchronizing pulses, apparatus for removing said subcarrier wave bursts from said composite signal to enable modification of the remainder of said composite signal and for subsequently reinserting said subcarrier wave bursts, said apparatus comprising, an oscillator having input and output circuits and producing in its output circuit a continuous wave at substantially said subcarrier wave frequency, a deflection synchronizing signal separator coupled to a source of said composite television signal to segregate said synchronizing pulses, means responsive to the trailing edges of said segregated synchronizing pulses to produce gate-controlling pulses coinciding with the subcarrier wave bursts of said composite television signal, a first signal mixer having two input circuits and an output circuit, means impressing said composite signal upon one of the input circuits of said first signal mixer, a normally closed gating device responsive to said subcarrier wave frequency, means coupled between said composite television signal source and said oscillator input circuit and operative to impress said subcarrier wave bursts upon said oscillator to lock the continuous wave oscillator output in a predetermined phase relationship with said subcarrier wave bursts, said gating device being coupled between said oscillator output circuit and the other input circuit of said first signal mixer and operative when opened to impress 180° out-of-phase bursts of said oscillator-produced wave upon said first signal mixer to produce in said first signal mixer output circuit a composite television signal with said subcarrier wave bursts removed so that the remainder of said composite television signal may be modified, means impressing said gate-controlling pulses upon said gating device to operatively open it, a second signal mixer having two input circuits and an output circuit, means impressing said modified composite television signal upon one of said second signal mixer input circuits, and means coupling said second gating device to the other input circuit of said second signal mixer to reinsert said subcarrier wave bursts into said composite television signal produced in said second signal mixer output circuit.

6. In a color television system employing a composite signal including a luminance video signal signal, a chrominance video signal-modulated color subcarrier wave, deflection synchronizing pulses, and periodic color synchronizing signal bursts of unmodulated color subcarrier wave following said deflection synchronizing pulses, apparatus for removing said subcarrier wave bursts from said composite signal to enable modification of the remainder of said composite signal, said apparatus comprising, an oscillator having input and output circuits and producing in its output circuit a continuous wave at substantially said subcarrier wave frequency, a deflection synchronizing signal separator coupled to a source of said composite television signal to segregate said synchronizing pulses, means coupled to said pulse-segregating means to differentiate said pulses, means responsive to said trailing edge differentiation impulses to produce gate-controlling pulses coinciding with the subcarrier wave bursts of said composite television signal, a signal mixer having two input circuits and an output circuit, means impressing said composite signal upon one of the input circuits of said signal mixer, normally closed first and second gating devices responsive to said subcarrier wave frequency, said first gating device being coupled between said composite television signal source and said oscillator input circuit and operative when opened to impress said subcarrier wave bursts upon said oscillator to lock the continuous wave oscillator output 180° out of phase with said subcarrier wave bursts, said second gating device being coupled between said oscillator output circuit and the other input circuit of said signal mixer and operative when opened to impress 180° out-of-phase bursts of said oscillator-produced wave upon said signal mixer to produce in said signal mixer output circuit a composite television signal with said subcarrier wave bursts removed so that the remainder of said composite television signal may be modified, and means impressing said gate-controlling pulses upon said first and second gating devices to operatively open them.

7. In a color television system employing a composite signal including a luminance video signal, a chrominance video signal-modulated color subcarrier wave, deflection synchronizing pulses, and periodic color synchronizing signal bursts of unmodulated color subcarrier wave following said deflection synchronizing pulses, apparatus for removing said subcarrier wave bursts from said composite signal to enable modification of the remainder of said composite signal and for subsequently reinserting said subcarrier wave burts, said apparatus comprising, an oscillator having input and output circuits and producing in its output circuit a continuous wave at substantially said subcarrier wave frequency, a deflection synchronizing signal separator coupled to a source of said composite television signal to segregate said synchronizing pulses, means coupled to said pulse-segregating means to differentiate said pulses, means responsive to said trailing edge differentiation impulses to produce gate-controlling pulses coinciding with the subcarrier wave bursts of said composite television signal, a first signal mixer having two input circuits and an output circuit, means impressing said composite signal upon one of the input circuits of said first signal mixer, normally closed first and second gating devices responsive to said subcarrier wave frequency, said first gating device being coupled between said composite television signal source and said oscillator input circuit and operative when opened to impress said subcarrier wave bursts upon said oscillator to lock the continuous wave oscillator output 180° out-of-phase with said subcarrier wave bursts, said second gating device being coupled between said oscillator output circuit and the other input circuit of said first signal mixer and operative when opened to impress 180° out-of-phase bursts of said oscillator-produced wave upon said first signal mixer to produce in said first signal mixer output circuit a composite television signal with said subcarrier wave bursts removed so that the remainder of said composite television signal may be modified, means impressing said gate-controlling pulses upon said first and second gating devices to operatively open them, a second signal mixer having two input circuits and an output circuit, means impressing said modified composite television signal upon one of said second signal mixer input circuits, and means coupling said second gating device to the other input circuit of said second signal mixer to reinsert said subcarrier wave bursts into said composite television signal produced in said second signal mixer output circuit.

References Cited in the file of this patent

UNITED STATES PATENTS

| | | |
|---|---|---|
| 2,319,789 | Chambers | May 25, 1943 |
| 2,378,746 | Beers | June 19, 1945 |
| 2,465,371 | Grieg | Mar. 29, 1949 |
| 2,594,380 | Barton | Apr. 29, 1952 |
| 2,653,187 | Luck | Sept. 22, 1953 |
| 2,680,147 | Rhodes | June 1, 1954 |

OTHER REFERENCES

"Introduction to Color Television," Admiral Corp., Chicago, Illinois, February 1954, pp. 17–27.